United States Patent
Prociw et al.

(10) Patent No.: US 9,989,257 B2
(45) Date of Patent: Jun. 5, 2018

(54) COOLING IN STAGED FUEL SYSTEMS

(71) Applicant: Delavan Inc, West Des Moines, IA (US)

(72) Inventors: Lev A. Prociw, Johnston, IA (US); Timothy Griffith, Urbandale, IA (US)

(73) Assignee: Delavan Inc, West Des Moines, IA (US)

( * ) Notice: Subject to any disclaimer, the term of this patent is extended or adjusted under 35 U.S.C. 154(b) by 327 days.

(21) Appl. No.: 14/749,293

(22) Filed: Jun. 24, 2015

(65) Prior Publication Data

US 2016/0377291 A1    Dec. 29, 2016

(51) Int. Cl.
| | | |
|---|---|---|
| *F23D 14/78* | (2006.01) | |
| *F02C 7/22* | (2006.01) | |
| *F02C 7/224* | (2006.01) | |
| *F02C 7/228* | (2006.01) | |
| *F23R 3/28* | (2006.01) | |
| *F23R 3/34* | (2006.01) | |

(52) U.S. Cl.
CPC .............. *F23R 3/283* (2013.01); *F02C 7/222* (2013.01); *F02C 7/224* (2013.01); *F23D 14/78* (2013.01); *F23R 3/346* (2013.01); *F02C 7/228* (2013.01); *F05D 2260/232* (2013.01); *F23D 2214/00* (2013.01)

(58) Field of Classification Search
CPC .......... F02C 7/222; F02C 7/224; F02C 7/228; F23D 14/78; F23D 11/36
See application file for complete search history.

(56) References Cited

U.S. PATENT DOCUMENTS

| | | | | |
|---|---|---|---|---|
| 4,262,482 A | * | 4/1981 | Roffe | F02C 7/224 431/247 |
| 4,298,338 A | * | 11/1981 | Babington | F23C 7/02 239/433 |
| 5,257,502 A | * | 11/1993 | Napoli | F02C 7/228 60/739 |
| 5,261,222 A | * | 11/1993 | Napoli | F02C 7/228 60/778 |

(Continued)

FOREIGN PATENT DOCUMENTS

WO    WO-2015/023863 A1    2/2015

OTHER PUBLICATIONS

Extended European Search Report, issued in corresponding European Patent Application No. EP 16175740.6, dated Feb. 14, 2017.

*Primary Examiner* — Lorne Meade
*Assistant Examiner* — Eric Linderman
(74) *Attorney, Agent, or Firm* — Locke Lord LLP; Scott D. Wofsy; Joshua L. Jones

(57) ABSTRACT

A fuel system includes a fuel supply system. A plurality of fuel nozzles are connected in fluid communication with the fuel supply system to supply fuel from a fuel source to be issued for combustion from the fuel nozzles. A cooling system is included, wherein at least one of the fuel nozzles includes a cooling circuit in addition to a fuel circuit for issuing fuel from the fuel supply system for combustion. The cooling circuit includes an inlet and an outlet. The inlet is in fluid communication with the cooling system for circulation of coolant through the cooling circuit and back to the cooling system out the outlet of the cooling circuit for cooling the fuel circuit with the fuel circuit staged off.

3 Claims, 9 Drawing Sheets

(56) References Cited

U.S. PATENT DOCUMENTS

| | | | | |
|---|---|---|---|---|
| 5,503,548 A * | 4/1996 | Franke | | F23C 6/04 |
| | | | | 239/129 |
| 5,570,580 A * | 11/1996 | Mains | | F23D 11/36 |
| | | | | 239/132.5 |
| 5,577,386 A * | 11/1996 | Alary | | F23D 11/36 |
| | | | | 239/132.5 |
| 5,845,484 A * | 12/1998 | Maker | | F02C 7/228 |
| | | | | 60/39.281 |
| 6,003,781 A | 12/1999 | Kwan | | |
| 6,357,237 B1 * | 3/2002 | Candy | | F23D 11/36 |
| | | | | 60/737 |
| 6,775,984 B2 | 8/2004 | Lavie et al. | | |
| 7,506,510 B2 | 3/2009 | Thomson | | |
| 8,079,220 B2 | 12/2011 | Haggerty | | |
| 8,141,368 B2 | 3/2012 | Goeke et al. | | |
| 8,387,400 B2 | 3/2013 | Goeke et al. | | |
| 2002/0073708 A1 | 6/2002 | Lavie et al. | | |
| 2005/0097895 A1 * | 5/2005 | Kothnur | | F02C 7/222 |
| | | | | 60/776 |
| 2006/0107666 A1 * | 5/2006 | Kothnur | | F02C 7/222 |
| | | | | 60/773 |
| 2007/0163263 A1 | 7/2007 | Thomson | | |
| 2009/0126802 A1 * | 5/2009 | Rawlinson | | F02C 7/228 |
| | | | | 137/98 |
| 2009/0272116 A1 * | 11/2009 | Bland | | F23C 6/047 |
| | | | | 60/737 |
| 2011/0146807 A1 * | 6/2011 | Bassmann | | F02C 7/222 |
| | | | | 137/15.05 |
| 2013/0152597 A1 * | 6/2013 | Durbin | | F23R 3/286 |
| | | | | 60/773 |
| 2014/0150434 A1 * | 6/2014 | Belsom | | F23R 3/286 |
| | | | | 60/773 |
| 2015/0285501 A1 * | 10/2015 | DiCintio | | F23R 3/14 |
| | | | | 60/740 |
| 2015/0322862 A1 * | 11/2015 | Fuller | | F02C 7/222 |
| | | | | 60/739 |
| 2016/0146468 A1 * | 5/2016 | Gao | | F23R 3/20 |
| | | | | 60/742 |
| 2016/0305276 A1 * | 10/2016 | Meisl | | F01D 25/002 |
| 2016/0305667 A1 * | 10/2016 | Wolfe | | B23P 15/00 |
| 2017/0074518 A1 * | 3/2017 | Lee | | F23R 3/286 |

* cited by examiner

COOLING IN STAGED FUEL SYSTEMS

BACKGROUND OF THE INVENTION

1. Field of the Invention

The present disclosure relates to staged fuel systems, and more particularly to staged fuel systems such as used in gas turbine engines.

2. Description of Related Art

A variety of devices and methods are known in the art for injecting fuel into gas turbine engines. Of such devices, many are directed to injecting fuel into combustors of gas turbine engines under high temperature conditions while reducing or preventing carbon formation or coking within fuel passages.

It is well known that fuels typically used in gas turbine engines are susceptible to breaking down into their constituent components when exposed to high temperatures. For example, if wetted wall temperatures in fuel lines utilizing Jet A fuel are allowed to reach about 350° F., the fuel will begin to break down, which can lead to carbon formation within the fuel lines. This phenomenon is known as coking. Since coking can build up and constrict and eventually block fuel passages, and since coke may flake off resulting in a large foreign object which can then clog or plug sensitive portions of the fuel injector, considerable efforts have been made to protect fuel circuits in fuel injectors and nozzles from high temperatures within gas turbine engines.

Staged fuel injectors for gas turbine engines typically include a pilot fuel atomizer for use during engine ignition and low power operation and at least one main fuel atomizer for use during higher power operation in concert with the pilot fuel atomizer. One difficulty associated with operating a staged fuel injector is that when the pilot fuel circuit is operating alone during low power operation, stagnant fuel located within the main fuel circuit can be susceptible to coking due to the temperatures associated with the operating environment. This can degrade engine performance over time if the main fuel circuitry becomes constricted or blocked from coking, as described above. To address this, maintenance can be performed on the injectors.

High performance gas turbines often utilize circumferential or radial staging of fuel injectors to help limit emissions and maintain stability at part power conditions. Staging injectors circumferentially is sometimes referred to as selective fuel injection, which can be accomplished through injector to injector fuel control, staging within a multi-circuit injector, or some combination thereof. This technique can be used with piloted or non-piloted fuel injectors. As an example, at low throttle conditions only half or less of the injectors of a combustor may be used to actually issue fuel. Fuel within the remaining nozzles not issuing fuel to the combustor is susceptible to coking, just as stagnant circuits in staged fuel injectors described above. Coking can occur during selective fuel injection regardless of what type of fuel injectors are used.

In the past, attempts were made to extend injector life by passively insulating, active cooling, or otherwise protecting the fuel circuitry of fuel injectors from carbon formation during low power engine operation. Passive insulation often involves incorporation of heat shielding into injector design. Purging stagnant fuel from unused fuel circuits is another possible way of extending injector life, but this requires a pressure source, typically compressor discharge air ingested by the injector, to force stagnant fuel from the circuit. For staged fuel injectors, efforts have also been made to actively cool stagnant fuel using fuel flow from a pilot fuel circuit. This usually involves use of a second source such as a cool fuel line or cooled air flow to remove heat from stagnant fuel circuits. One such effort is disclosed in U.S. Pat. No. 5,570,580 to Mains, which provides a fuel injector having two dual orifice injector tips, each with a primary and secondary pressure atomizer. In this injector, fuel streams to the primary and secondary sprays of the pilot and main nozzle tips are arranged to transfer heat between the pilot primary fuel stream and each of the main secondary fuel stream and the pilot secondary fuel stream. However, in these active cooling techniques, the heat capacity of the cooling media and its proximity to the stagnant fuel circuit can limit the effectiveness of actively cooling the stagnant circuit.

U.S. Patent Application Publication No. 2007/0163263 to Thomson, incorporated by reference herein in its entirety, describes a staged airblast fuel injector designed for active cooling. Fuel passing through the pilot fuel circuit is routed through the injector to cool stagnant fuel within the main fuel circuit during low power engine operation. This configuration can reduce or prevent carbon formation or coking in the main fuel circuit of the injector.

Such conventional methods and systems generally have been considered satisfactory for their intended purpose. However, there is still a need for improved systems and methods for thermal management of staged fuel systems. The present disclosure provides a solution for these problems.

SUMMARY OF THE INVENTION

A fuel system includes a fuel supply system. A plurality of fuel nozzles are connected in fluid communication with the fuel supply system to supply fuel from a fuel source to be issued for combustion from the fuel nozzles. A cooling system is included, wherein at least one of the fuel nozzles includes a cooling circuit in addition to a fuel circuit for issuing fuel from the fuel supply system for combustion. The cooling circuit includes an inlet and an outlet. The inlet is in fluid communication with the cooling system for circulation of coolant through the cooling circuit and back to the cooling system out the outlet of the cooling circuit for cooling the fuel circuit with the fuel circuit staged off.

In accordance with certain embodiments, the fuel supply system includes first and second fuel manifolds. The first fuel manifold is connected in fluid communication with a first subset of the fuel nozzles to supply fuel from a fuel source to be issued for combustion from the first subset of fuel nozzles. The second fuel manifold is connected in fluid communication with a second subset of the fuel nozzles to selectively supply fuel from a fuel source to be issued for combustion from the second subset of fuel nozzles with the second subset of fuel nozzles staged on. Each of the fuel nozzles of the second subset includes a cooling circuit in addition to a fuel circuit for issuing fuel from the second fuel manifold for combustion, wherein the cooling circuit includes an inlet and an outlet, wherein the inlet is in fluid communication with the cooling system for circulation of coolant through the cooling circuit and back to the cooling system out the outlet of the cooling circuit for cooling the fuel circuit with the fuel circuits of the second subset of fuel nozzles staged off.

The cooling system can include a first coolant manifold connected in fluid communication to supply coolant to the inlets of the cooling circuits of the second subset of fuel nozzles, and a second coolant manifold connected in fluid communication to receive coolant from the outlets of the cooling circuits of the second subset of fuel nozzles. It is also contemplated that a heat exchanger can be connected in fluid communication with the second coolant manifold for removing heat from coolant received from the second subset of fuel nozzles, and a coolant pump can be connected in fluid communication between the heat exchanger and the first coolant manifold to drive coolant flow through the cooling system.

In another aspect, each of the fuel nozzles of the first subset can include a cooling circuit in addition to a fuel circuit for issuing fuel for combustion, wherein the cooling circuit includes an inlet and an outlet, wherein the inlet is in fluid communication with the cooling system for circulation of coolant through the cooling circuit and back to the cooling system out the outlet of the cooling circuit for cooling the fuel circuit. The cooling system can include a first coolant manifold for supplying coolant to the inlets of the cooling circuits of the first and second subsets of fuel nozzles, and a second coolant manifold for receiving coolant from the outlets of the cooling circuits of the first and second subsets of fuel nozzles.

It is also contemplated that the cooling system can include a coolant conduit connected for fluid communication of coolant from the outlet of the cooling circuit of a first one of the fuel nozzles of the second subset to the inlet of the cooling circuit of a second one of the fuel nozzles of the second subset. A first coolant manifold can be connected in fluid communication to supply coolant to the inlet of the cooling circuit of the first one of the fuel nozzles of the second subset, and a second coolant manifold can be connected in fluid communication to receive coolant from the outlet of the cooling circuit of another one of the fuel nozzles of the second subset. For example, a first coolant manifold can be connected in fluid communication to supply coolant to the inlet of the cooling circuit of the first one of the fuel nozzles of the second subset, and a second coolant manifold can be connected in fluid communication to receive coolant from the outlet of the cooling circuit of the second one of the fuel nozzles of the second subset.

In accordance with another aspect, the fuel supply system can include a first fuel manifold connected in fluid communication with a first subset of the fuel nozzles to supply fuel from a fuel source to be issued for combustion from a second subset of the fuel nozzles. The cooling system can include a second fuel manifold connected in fluid communication with the second subset of the fuel nozzles to selectively supply fuel from a fuel source to be issued for combustion from another subset of the fuel nozzles that are staged on. Each of the fuel nozzles of the first and second subsets can include a cooling circuit in addition to a fuel circuit for issuing fuel for combustion, wherein the cooling circuit includes an inlet and an outlet, wherein the inlet is in fluid communication with the cooling system for circulation of coolant through the cooling circuit and back to the cooling system out the outlet of the cooling circuit for cooling the fuel circuits of at least one subset of fuel nozzles that is staged off.

For example, the cooling system can include a second fuel manifold connected in fluid communication with the second subset of the fuel nozzles to selectively supply fuel from a fuel source to be issued for combustion from the first subset of the fuel nozzles. The cooling system can include a respective coolant conduit connected for fluid communication of coolant from the outlet of the cooling circuit of one of the fuel nozzles of the first subset to the fuel circuit of one of the fuel nozzles of the second subset, and a respective coolant conduit connected for fluid communication of coolant from the outlet of the cooling circuit of one of the fuel nozzles of the second subset to the fuel circuit of one of the fuel nozzles of the first subset.

It is contemplated that each fuel nozzle that includes a cooling circuit can have a nozzle body defining a longitudinal axis including an air passage. The fuel circuit can be radially outboard from the air passage with respect to the longitudinal axis, the fuel circuit extending from a fuel circuit inlet to a fuel circuit annular outlet, wherein the fuel circuit is defined between a fuel circuit inner wall and a fuel circuit outer wall, wherein at least a portion of the fuel circuit outer wall is radially outboard from the fuel circuit inner wall with respect to the longitudinal axis. The cooling circuit can be defined within at least one of the fuel circuit inner wall and the fuel circuit outer wall, wherein the cooling circuit extends from an axial position proximate the fuel circuit inlet to an axial position proximate the fuel circuit outlet.

The nozzle body can include an outer air passage defined radially outboard of the fuel circuit with respect to the longitudinal axis. The outer air passage can be defined between a fuel circuit outer wall and an outer air passage wall. The outer air passage can be a converging non-swirling outer air passage.

The cooling system can be configured to cool the nozzles after engine shut down until the temperature proximate the fuel nozzles decreases below a predetermined limit to avoid formation of coke during engine cool down. The cooling system can be configured to circulate fluid in the cooling circuits prior to start up to help cool residual soakback or preheat the nozzles for cold day starts.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a schematic view of an exemplary embodiment of a fuel system constructed in accordance with the present disclosure, showing the fuel manifolds, coolant manifolds, and fuel nozzles wherein all of the fuel nozzles are staged on;

DETAILED DESCRIPTION OF THE PREFERRED EMBODIMENTS

Figure 2:
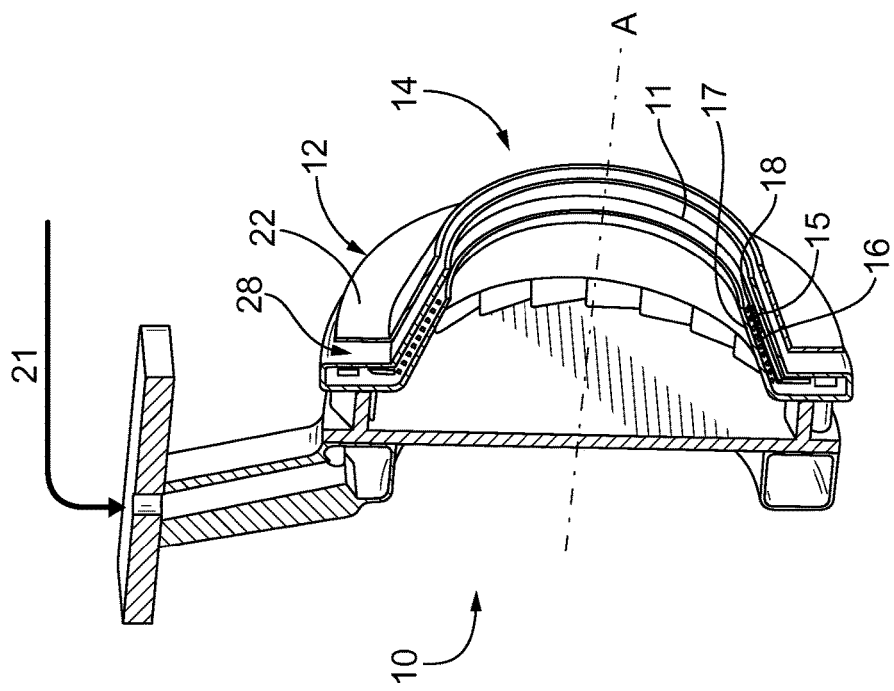
FIG. 2 is a cross-sectional perspective view of the fuel nozzle of FIG. 1, showing the fuel circuit and the cooling circuit.

Reference will now be made to the drawings wherein like reference numerals identify similar structural features or aspects of the subject disclosure. For purposes of explanation and illustration, and not limitation, a partial view of an exemplary embodiment of a fuel system in accordance with the disclosure is shown in FIG. 3 and is designated generally by reference character 100. Other embodiments of fuel systems in accordance with the disclosure, or aspects thereof, are provided in FIGS. 1-2 and 4-10, as will be described. The systems and methods described herein can be used to provide cooling to fuel nozzles that are staged off completely, e.g., for turn down in gas turbine engines. The systems and methods disclosed herein can also be used to provide cooling to nozzles that are shut off completely as when the engine is shut off and is cooling down.

Figure 1:
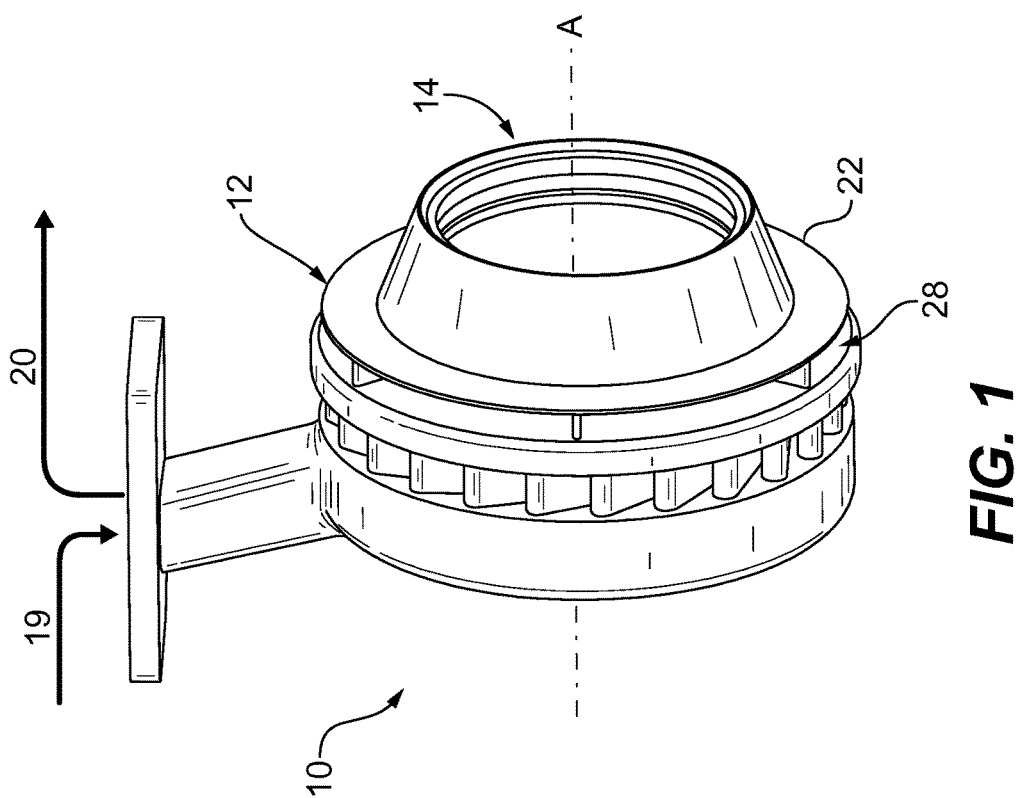
FIG. 1 is a perspective view of an exemplary embodiment of a fuel nozzle constructed in accordance with the present disclosure, showing the fuel inlet, cooling circuit inlet, and cooling circuit outlet.
Figure 3:
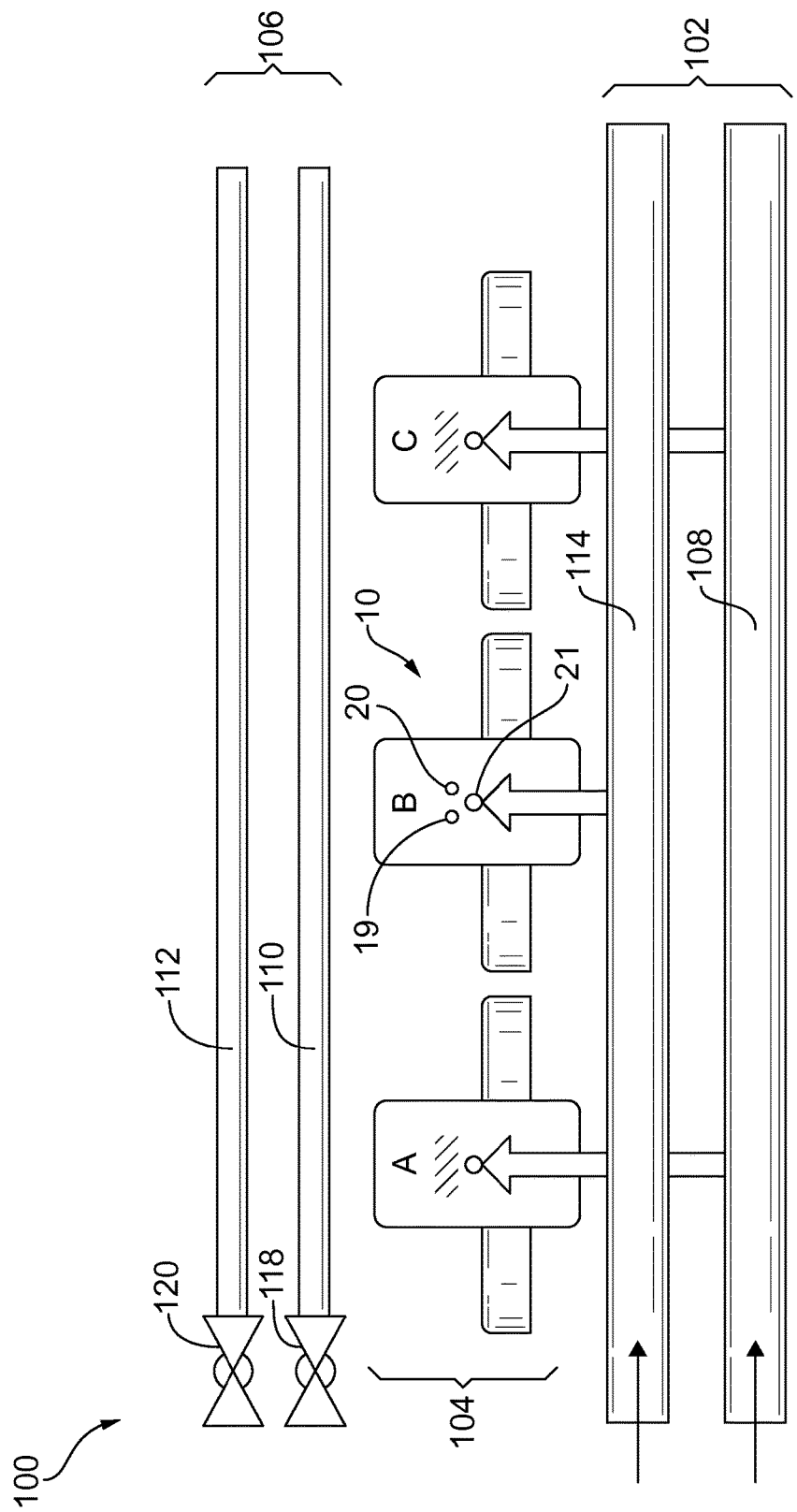

As shown in FIGS. 1 and 2, a nozzle 10 includes a nozzle body 12 defining a longitudinal axis A. Nozzle body 12 includes a fuel circuit 16 and a cooling circuit 15. Both circuits are radially outboard from an air passage 14 with respect to longitudinal axis A. Fuel circuit 16 is defined between a fuel circuit inner wall 17 and a fuel circuit outer wall 18, e.g. the annular fuel distributor. At least a portion of the fuel circuit outer wall 18 is radially outboard from the fuel circuit inner wall 17 with respect to the longitudinal axis A. Fuel circuit annular outlet 11 is proximate to the outlet of air passage 14. Cooling circuit 15 includes an inlet 19 and an outlet 20. The fuel circuit 16 extends from a fuel circuit inlet 21 to fuel circuit annular outlet 11. The cooling circuit 15 is defined within at least one of the fuel circuit inner wall 17 and the fuel circuit outer wall 18. Cooling circuit 15 extends from an axial position proximate the fuel circuit inlet 21 to an axial position proximate the fuel circuit outlet 11.

The nozzle body 12 includes an outer air passage 28 defined radially outboard of the fuel circuit 16 with respect to the longitudinal axis A. The outer air passage 28 is defined between fuel circuit outer wall 18 and an outer air passage wall 22. The outer air passage 28 can be a converging non-swirling outer air passage, for example. Those skilled in the art will readily appreciate that the configuration of nozzle 10 described herein is exemplary and that any other suitable nozzle configuration can be used in the systems described herein.

Figure 4:
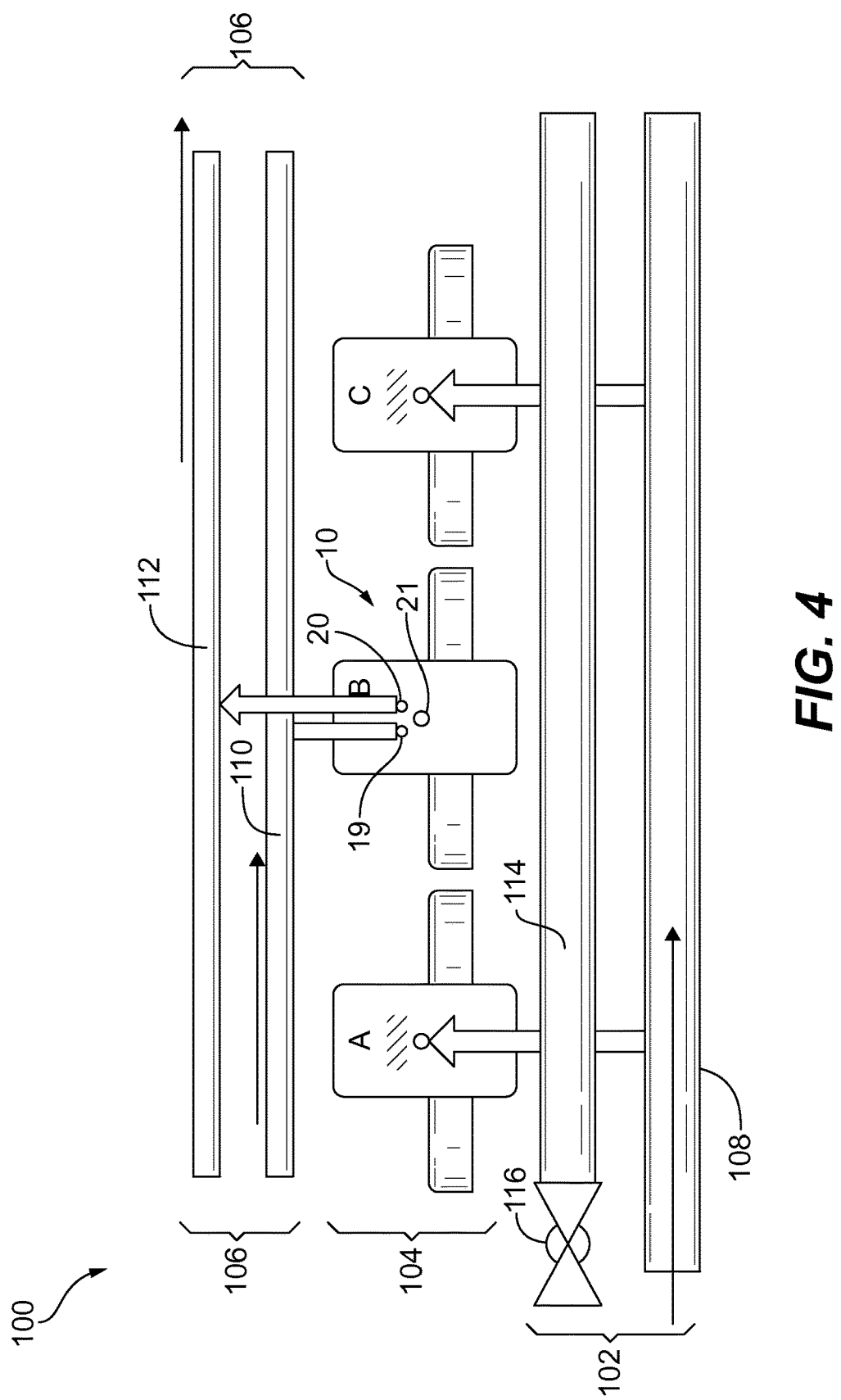
FIG. 4 is a schematic view of an exemplary embodiment of the fuel system of FIG. 3, wherein one subset of the fuel nozzles is staged off.

With reference now to FIG. 3, a fuel system 100 includes a fuel supply system 102. A plurality of fuel nozzles 104 are connected in fluid communication with the fuel supply system 102 to supply fuel from a fuel source to be issued for combustion from the fuel nozzles 104. A cooling system 106 is included, wherein at least one of the fuel nozzles 104 includes a cooling circuit in addition to a fuel circuit for issuing fuel from the fuel supply system 102, e.g., as in nozzle 10 as described above. Nozzle B in FIG. 4 is the same as nozzle 10 described above. Nozzles A and C in FIG. 4 are similar to nozzle 10, but do not have functioning cooling circuits, e.g., the cooling circuits for nozzles A and C are omitted, blocked off, or simply not connected to any cooling system.

As shown in FIG. 4, inlet 19 of cooling circuit 15 of nozzle 10 is in fluid communication with cooling system 106 for circulation of coolant through cooling circuit 15 and back to cooling system 106 out the outlet 20 of the cooling circuit 15 for cooling fuel circuit 16 with fuel circuit 16 staged off, e.g., by closing valve 116. In this state, fuel from fuel manifold 108 of fuel system 102 issues from nozzles A and C and additional cooling is not required for those nozzles A and C. Cooling for nozzle B is provided through its cooling circuit, which receives coolant from coolant manifold 110 of cooling system 106, and returns coolant through coolant manifold 112 of cooling system 106. When it is needed to issue fuel from nozzle B, as shown in FIG. 3, valve 116 can be opened, and optionally valves 118 and/or 120 of coolant manifolds 110 and 112 can be closed since fuel issuing from nozzle B can provide cooling in addition to or in lieu of cooling provided by cooling system 106.

Those skilled in the art will readily appreciate that as depicted in FIGS. 3 and 4, nozzles A and C are representative of a plurality of nozzles that are a first subset of nozzles 104 fed with fuel for combustion from a fuel source by the first fuel manifold 108, and that nozzle B is representative of a second plurality of nozzles that are a second subset of nozzles 104 fed with fuel for combustion from a fuel source by the second fuel manifold 114, and that this pattern can be repeated of alternating nozzle subsets can repeat for any suitable number of nozzles (as indicated by the ellipses in FIGS. 3 and 4). Those skilled in the art will also readily appreciate that the two subsets of nozzles need not be equal in number of nozzles, but can be in any suitable proportion without departing from the scope of this disclosure.

Figure 5:
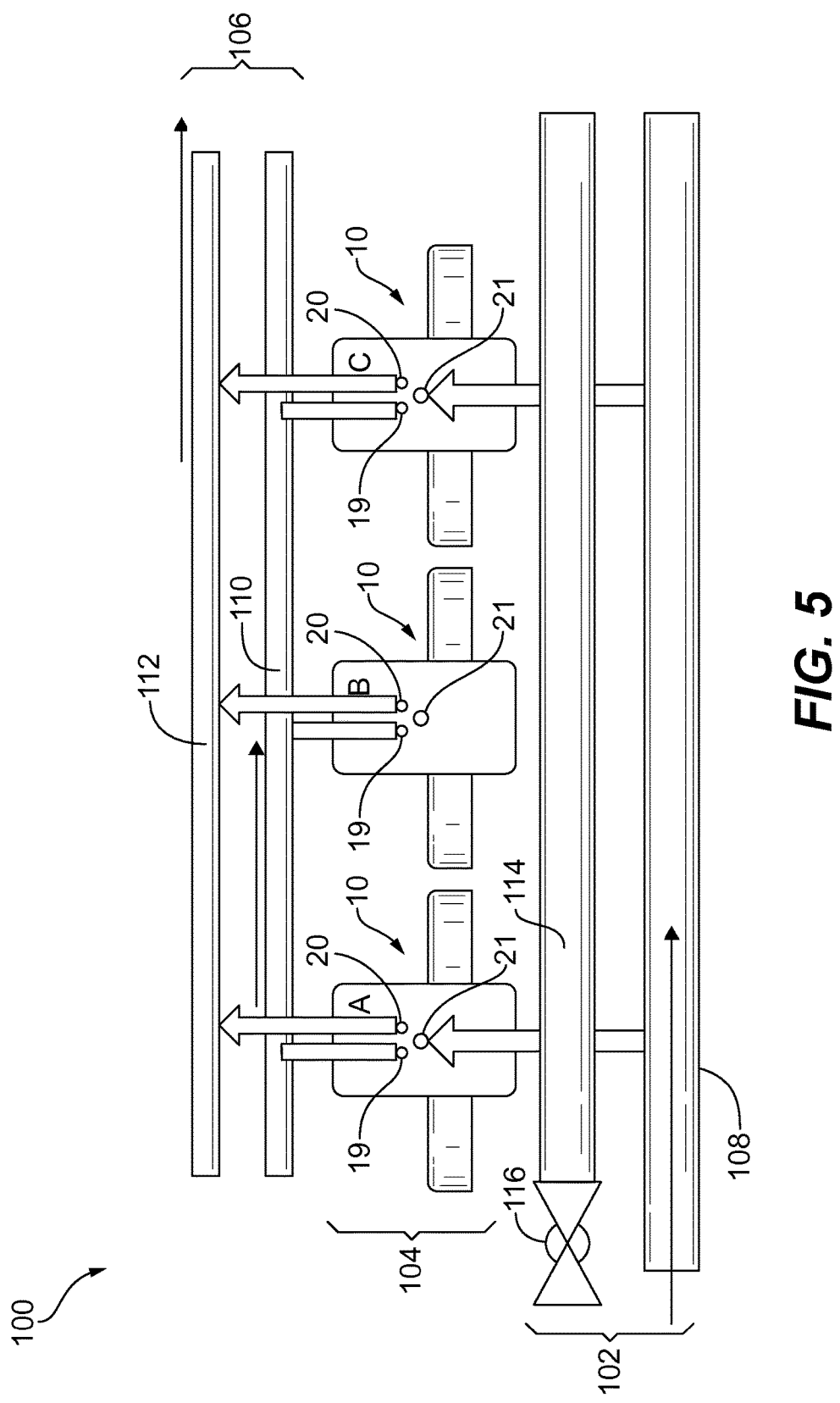
FIG. 5 is a schematic view of another exemplary embodiment of a fuel system, wherein all of the fuel nozzles include cooling circuits.

With reference now to FIG. 5, system 100 is shown with a variation in the nozzles 104 and cooling system 106. In FIG. 5, both subsets of nozzles in fuel nozzles 104, e.g., all of nozzles A, B, and C, includes a cooling circuit as in nozzle 10 described above connected to coolant system 106 as described above with respect to nozzle B in FIGS. 3 and 4. This allows for cooling to nozzles in both subsets full time. The subset corresponding to nozzle B in FIG. 5 can be staged off by closing valve 116 as described above, while the cooling circuit continues to provide cooling to all of the nozzles 104.

Figure 6:
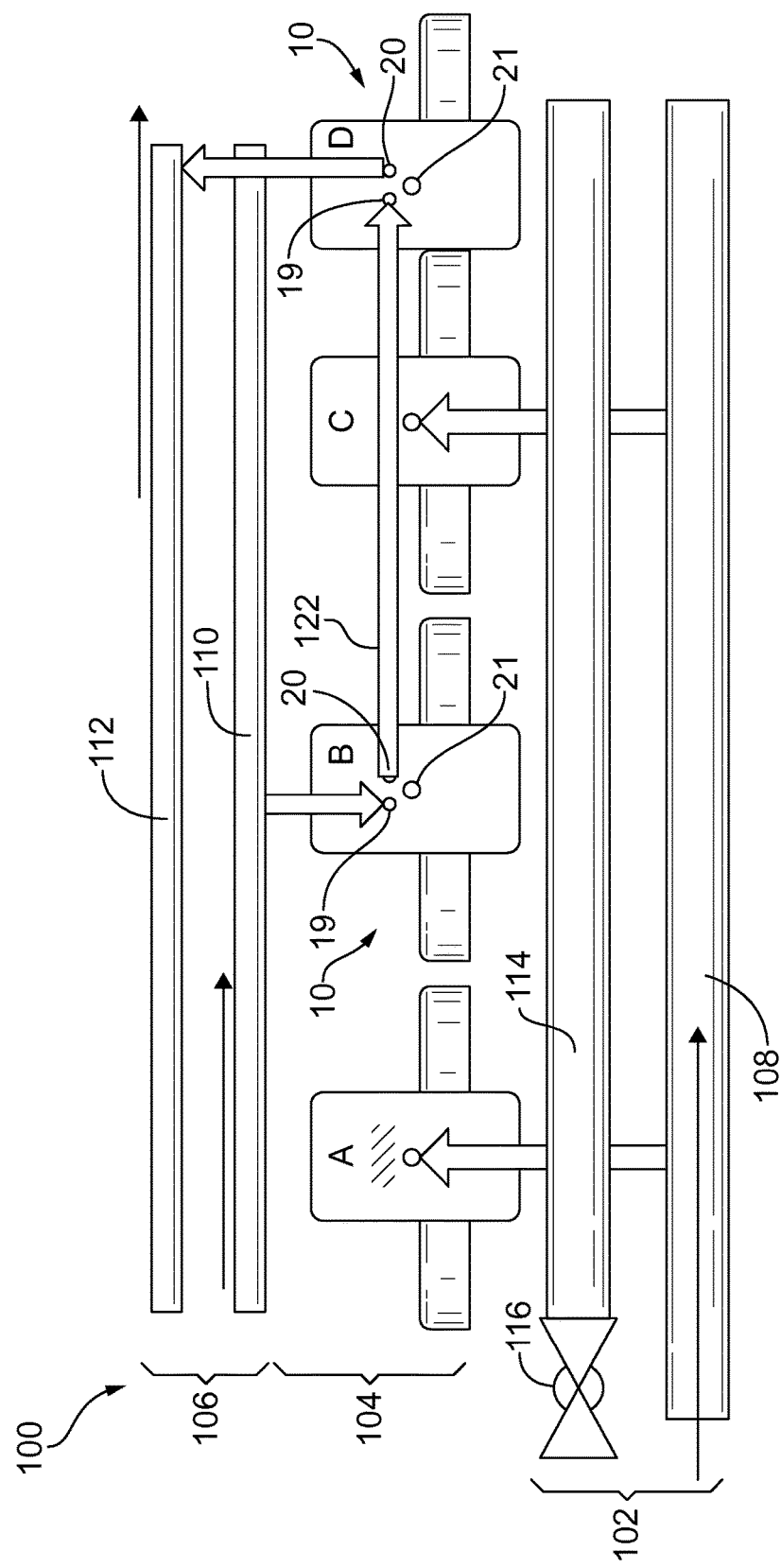
FIG. 6 is a schematic view of another exemplary embodiment of a fuel system, wherein the cooling system includes a conduit from the outlet of the cooling circuit of one nozzle to the inlet of the cooling circuit of another nozzle.

With reference now to FIG. 6, another embodiment of system 100 wherein cooling system 106 includes a coolant conduit 122 connected for fluid communication of coolant from the outlet 20 of the cooling circuit of a first one of the fuel nozzles 104 of the second subset of nozzles, e.g., nozzle B, to the inlet 19 of the cooling circuit of a second one of the fuel nozzles of the second subset, e.g., nozzle D in FIG. 6. Coolant manifold 110 is connected in fluid communication to supply coolant to the inlet 19 of the cooling circuit of the first one of the fuel nozzles, e.g., nozzle B, and coolant manifold 112 is connected in fluid communication to receive coolant from the outlet of the cooling circuit of another one of the fuel nozzles of the second subset, e.g., nozzle D of FIG. 6. The pattern of nozzles 104 shown in FIG. 6 can be repeated for any suitable number of nozzles 104 as indicated in FIG. 6 by the ellipses. Those skilled in the art will readily appreciate that the alternating pattern of nozzles 104 having cooling circuits and not having cooling circuits in FIG. 6 is exemplary only, and that any other suitable pattern can be used. For example, it is contemplated that multiple conduits 112 can connect multiple nozzles such as nozzles B and D together in series.

Figure 7:
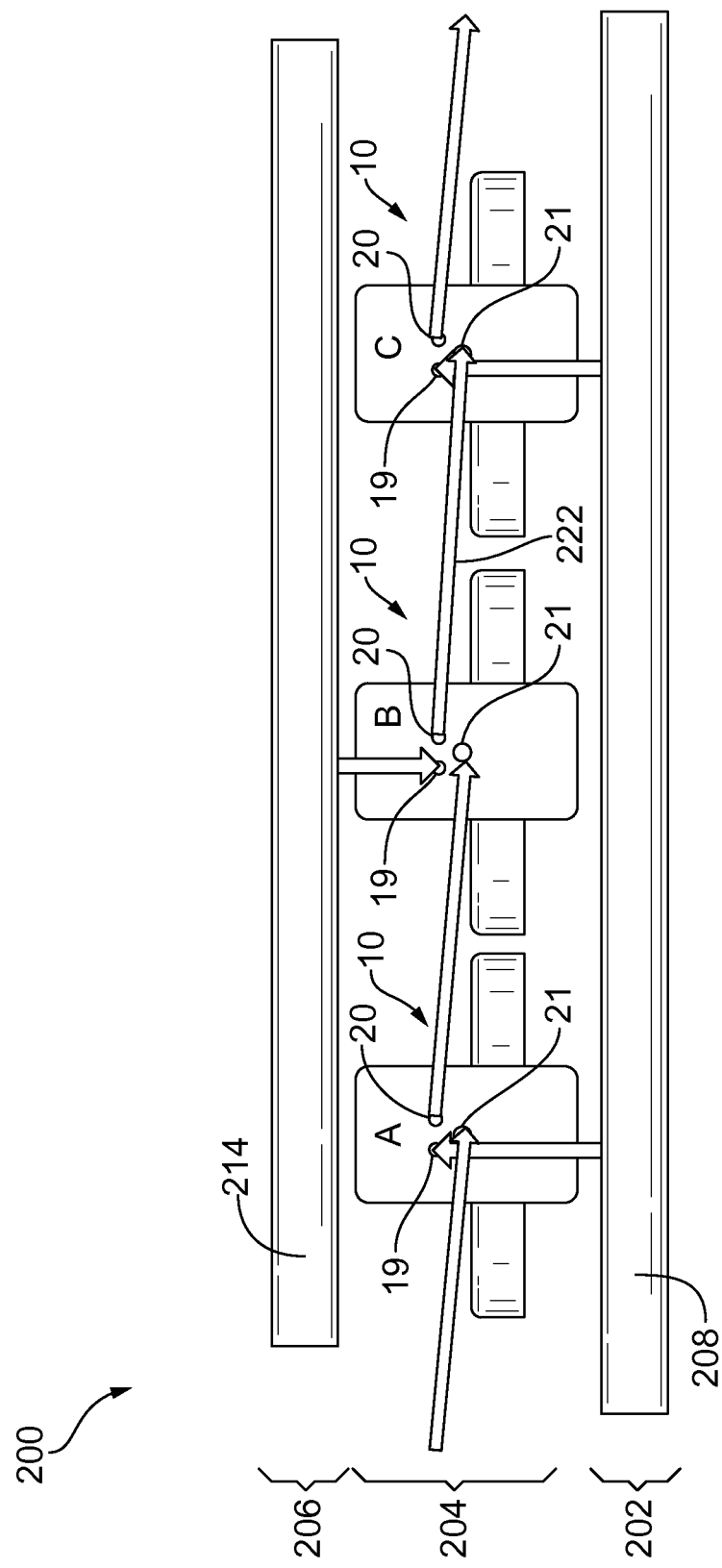
FIG. 7 is a schematic view of another exemplary embodiment of a fuel system, wherein the cooling system includes conduits from the outlet of the cooling circuit of each fuel nozzle to the fuel inlet of another respective fuel nozzle.

Referring now to FIG. 7, another exemplary embodiment of a system 200 is shown, wherein the coolant is fuel that is issued for combustion. Fuel supply system 202 includes a first fuel manifold 208 connected in fluid communication with a first subset of the fuel nozzles 204, e.g., nozzles A and C in FIG. 7, to supply fuel from a fuel source to be issued for combustion from a second subset of the fuel nozzles 204, e.g., nozzle B and other nozzles alternating with the first subset of nozzles 204 as the pattern of nozzles 204 is repeated as indicated by the ellipses in FIG. 7. The cooling system 206 include a second fuel manifold 214 connected in fluid communication with the second subset of the fuel nozzles 204, e.g., nozzles B, to selectively supply fuel from a fuel source to be issued for combustion from another subset of the fuel nozzles 204, e.g., nozzles A and B, that are staged on. In a sense, each fuel manifold 208 and 214 is part of both the fuel supply and cooling systems 202 and 206.

Each of the fuel nozzles 204 of the first and second subsets include a cooling circuit as described above with respect to nozzle 10. For example, in nozzle B the inlet 19 is in fluid communication with the cooling system 206 for circulation of coolant through the cooling circuit and back to the cooling system, namely conduit 222, out the outlet 20. Conduit 222 feeds the fuel circuit of nozzle C, which issues the coolant fuel for combustion. Nozzles A and C are connected to receive coolant fuel from fuel manifold 208 through their coolant inlets 19. The fuel is returned to the cooling system, namely to the respective conduits 222, to supply coolant fuel from their cooling circuits to fuel circuit inlets 21 of nozzles in the other subset, namely nozzles B, for combustion. Either subset of nozzles 204 can be staged off while providing a flow of coolant through the cooling circuit of the staged off nozzles 204.

Figure 8:
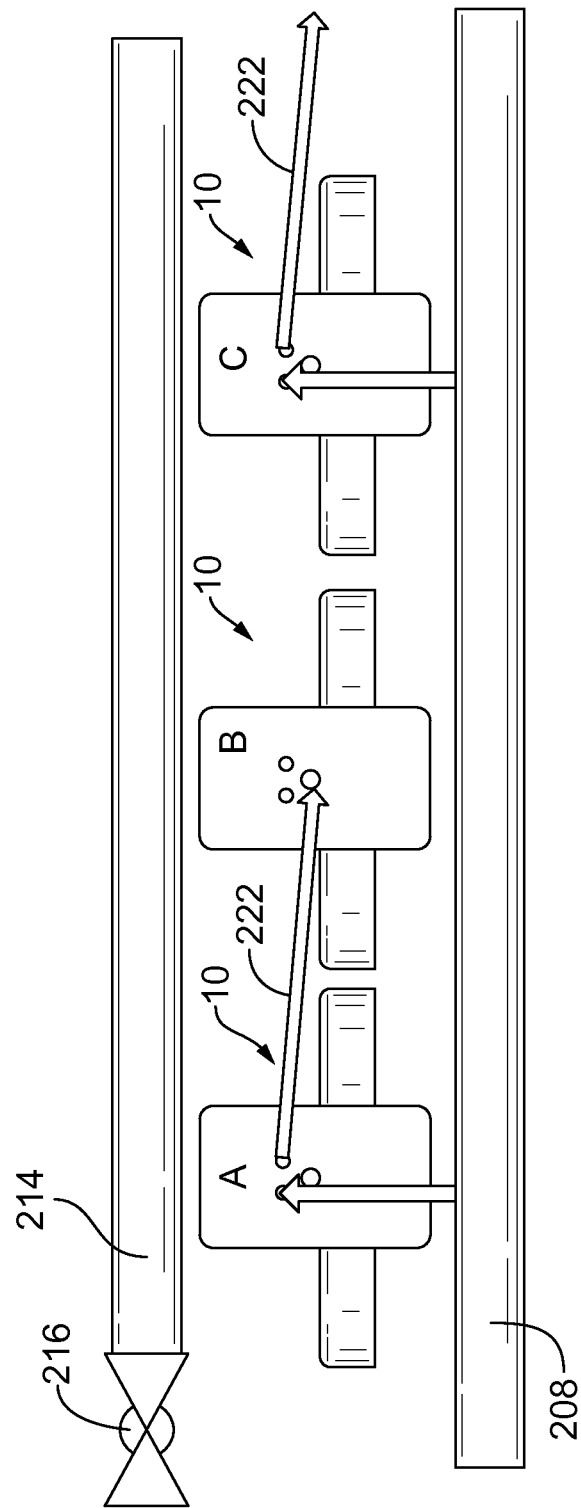
FIG. 8 is a schematic view of the fuel system of FIG. 7, showing one subset of the fuel nozzles staged off.

As shown in FIG. 8 the nozzles 204 in the same subset as nozzles A and C can be staged off by closing a valve 216 on fuel manifold 214. This stops the flow of coolant fuel through the cooling circuits of the nozzles in the same subset with nozzle B, however cooling that subset is not required because the fuel circuits provide cooling. Moreover, although no fuel in the state shown in FIG. 8 issues from the nozzles 204 in the same subset with nozzles A and C, cooling is provided by the coolant fuel flowing through the cooling circuits to reach the staged on subset of nozzles 204.

Those skilled in the art will readily appreciate that either subset of nozzles 204 can be staged off by stopping flow from the respective fuel manifold 208 or 214. For example, the staged off subset could alternate between the two subsets with every engine start up to reduce cumulative effects on either subset. Moreover, those skilled in the art will readily appreciate that any suitable number of separate stages can be included. For example, with n manifolds, a first subset of nozzles can be cooled by coolant fuel that issues for combustion from a second subset. The second subset can be cooled with coolant fuel that issues for combustion from a third subset, and so on until an n−1 subset is cooled with coolant fuel that issues for combustion from an nth subset, wherein the nth subset is cooled by coolant fuel that issues for combustion from the first subset.

Figure 9:
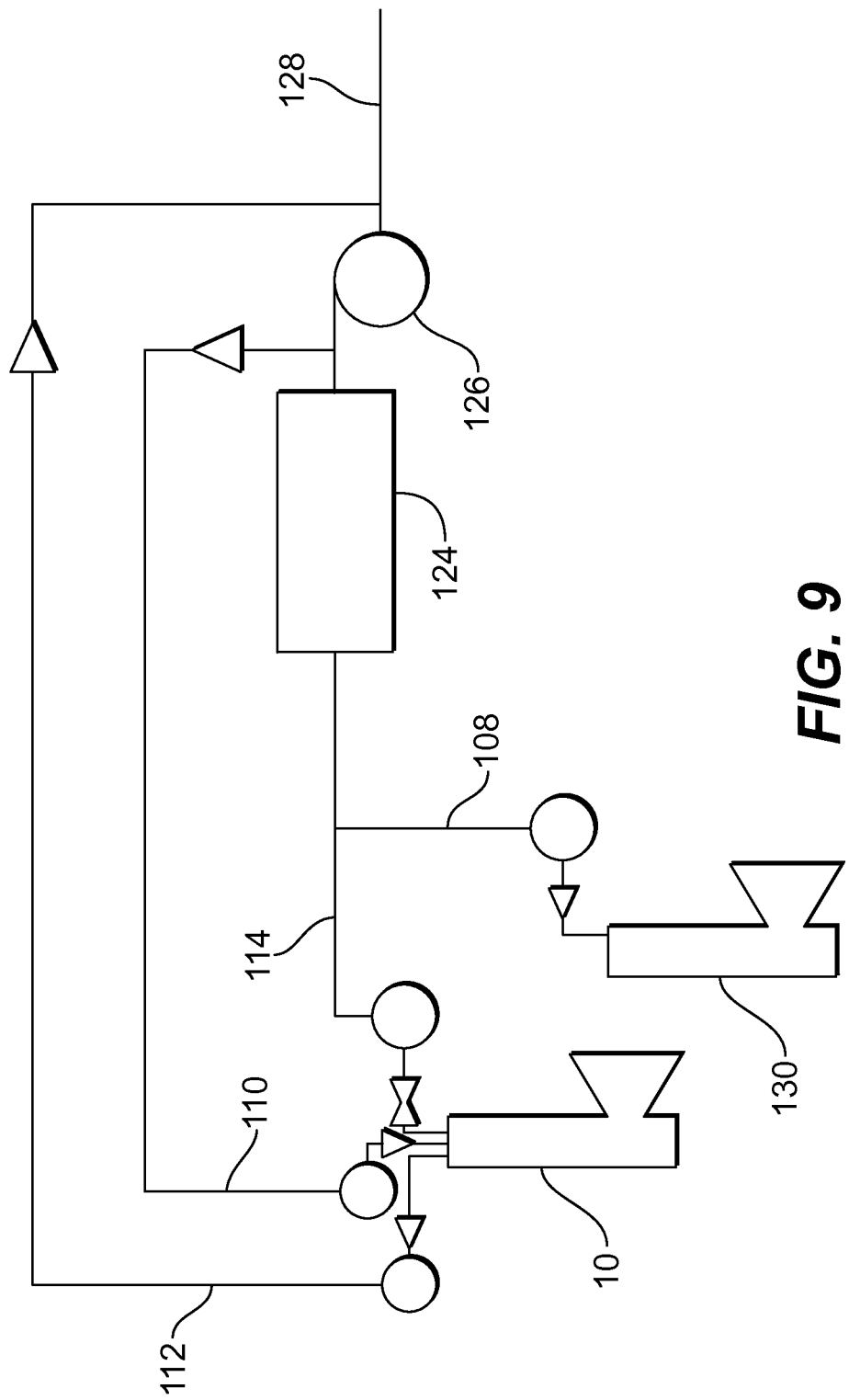
FIG. 9 is a schematic view of fuel system of FIG. 3, showing the fuel control pump.

With reference now to FIG. 9, system 100 is shown schematically including a fuel control 124 and an engine fuel pump 126, where fuel is used as the coolant in one subset of nozzles 104, e.g., nozzles B and D described above, and is returned to fuel source 128 where it can ultimately be mixed with fuel to be issued from the second subset 130 of nozzles 104, e.g., nozzles A and B described above, and/or recirculated to cool the first subset. This basic architecture can be applied to any of the embodiments of system 100 described above.

Figure 10:
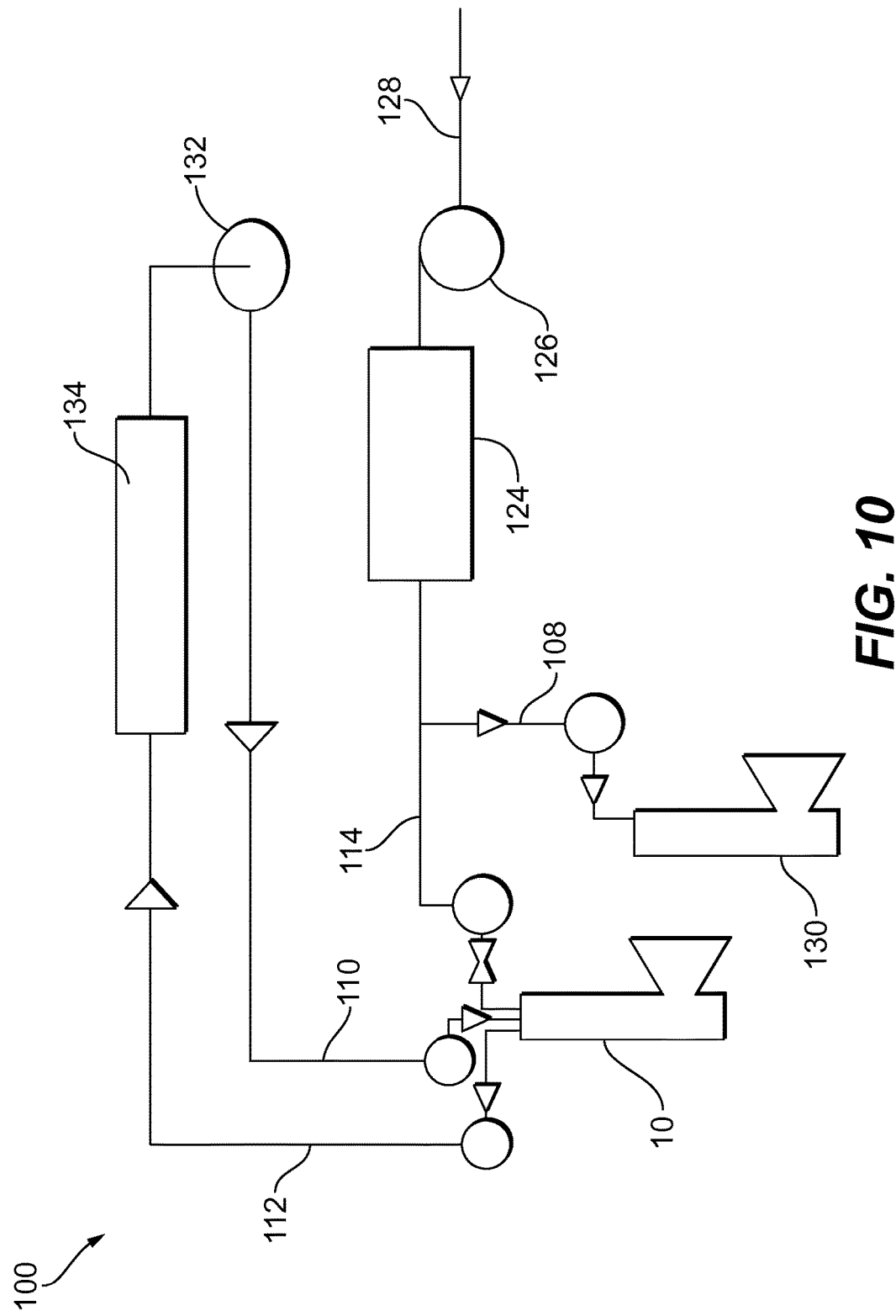
FIG. 10 is a schematic view of another exemplary fuel system, showing a heat exchanger in the cooling system.

With reference now to FIG. 10, it is also contemplated that system 100 can be modified to have a closed coolant circuit. A heat exchanger 134 can be connected in fluid communication with the second coolant manifold 112 for removing heat from coolant received from the second subset of fuel nozzles, e.g., nozzles B and D described above. A coolant pump 132 can be connected in fluid communication between the heat exchanger 134 and the first coolant manifold 110 to drive coolant flow through the cooling system, e.g., cooling system 106 described above. The coolant used in the systems and methods disclosed herein can be liquid fuel, e.g., in applications where the coolant is injected into the combustor. It is also contemplated, e.g., in applications where the coolant is not injected in to the combustor, that the coolant can be fuel or a fuel derivative or may be a water or oil based liquid suitably treated to prevent freezing, boiling, rusting or other phenomena detrimental to nozzle life. Those skilled in the art will readily appreciate that any suitable coolant can be used for a given application without departing from the scope of this disclosure.

For the purpose of clarity, methods and systems are described above wherein the fuel nozzles have only one fuel inlet. However, those skilled in the art will readily appreciate that fuel nozzles can have multiple fuel circuits without departing from the scope of this disclosure. For example, a nozzle can have both a primary and secondary fuel circuit, i.e., more than one fuel inlet, which may be independently staged. The cooling systems and methods described above can readily be applied to such nozzles, providing cooling to all fuel circuits.

Incorporating a coolant system independent of the fuel flow, allows for the cooling system to be activated at any time, e.g., even when the main engine is inactive. For example the system can be used to cool components prior to starting an engine to ensure any residual heat accumulated due to soakback is extracted from the walls of the fuel lines before filling those lines with fuel. The cooling system can be configured to cool the nozzles after engine shut down until the temperature proximate the fuel nozzles decreases below a predetermined limit to avoid formation of coke during engine cool down. Similarly, with an appropriate coolant heater, the systems described herein can be used to heat the fuel lines in situations of extreme cold, e.g., for engine start up on cold days. While it can be advantageous to use coolant systems and methods as described herein to provide cooling to fuel circuits that are staged off, it may also be advantageous to similarly provide cooling to fuel circuits that are staged on, e.g., wherein a fuel circuit is cooled full time whether or not it is staged on or off.

The methods and systems of the present disclosure, as described above and shown in the drawings, provide for staged fuel systems with superior properties including improved nozzle cooling. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A fuel system comprising:
a plurality of fuel nozzles connected in fluid communication with a fuel supply system to supply fuel from a fuel source;

the fuel supply system includes a first fuel manifold connected in fluid communication with a first subset of the fuel nozzles to supply fuel from the fuel source;

a cooling system includes a second fuel manifold connected in fluid communication with a second subset of the fuel nozzles to supply fuel from the fuel source;

wherein each one of the plurality of fuel nozzles includes a fuel circuit with a fuel circuit inlet and a cooling circuit having a cooling circuit inlet, and a cooling circuit outlet;

wherein each one of the plurality of fuel nozzles of the second subset of fuel nozzles is arranged in alternating pattern between a pair of fuel nozzles of the first subset of the fuel nozzles;

wherein fuel from the cooling circuit outlet of one of the fuel nozzles of the first subset of the fuel nozzles flowed to the fuel circuit inlet of an adjacent one of the plurality of fuel nozzles of the second subset of fuel nozzles for combustion; and wherein fuel from the cooling circuit outlet of one of the fuel nozzles of the second subset of the fuel nozzles flowed to the fuel circuit inlet of an adjacent one of the plurality of fuel nozzles of the first subset of fuel nozzles for combustion.

2. A fuel system as recited in claim 1, wherein each fuel nozzle that includes the cooling circuit includes:

a nozzle body defining a longitudinal axis including an air passage;

wherein the fuel circuit is radially outboard from the air passage with respect to the longitudinal axis, the fuel circuit extending from the fuel circuit inlet to a fuel circuit annular outlet, wherein the fuel circuit is defined between a fuel circuit inner wall and a fuel circuit outer wall, wherein at least a portion of the fuel circuit outer wall is radially outboard from the fuel circuit inner wall with respect to the longitudinal axis; and wherein the cooling circuit is defined within at least one of the fuel circuit inner wall and the fuel circuit outer wall, wherein the cooling circuit extends from an axial position proximate the fuel circuit inlet to an axial position proximate the fuel circuit annular outlet.

3. A fuel system as recited in claim 1, wherein a nozzle body includes an outer air passage defined radially outboard of the fuel circuit with respect to a longitudinal axis, and wherein the outer air passage is defined between a fuel circuit outer wall and an outer air passage wall, and wherein the outer air passage is a converging non-swirling outer air passage.

\* \* \* \* \*